(12) United States Patent
Austin

(10) Patent No.: US 6,581,547 B1
(45) Date of Patent: Jun. 24, 2003

(54) PET COLLAR WITH RETRACTABLE LEASH

(76) Inventor: Ronald J. Austin, P.O. Box 996, Graham, TX (US) 76450

( * ) Notice: Subject to any disclaimer, the term of this patent is extended or adjusted under 35 U.S.C. 154(b) by 0 days.

(21) Appl. No.: 10/014,994

(22) Filed: Dec. 11, 2001

(51) Int. Cl.[7] .......................... A01K 27/00; B65H 75/34
(52) U.S. Cl. .................... 119/794; 119/792; 119/796
(58) Field of Search ............................ 119/794, 792, 119/793, 796, 798, 858

(56) References Cited

U.S. PATENT DOCUMENTS

| | | |
|---|---|---|
| D125,944 S | 3/1941 | Stickell |
| 4,018,189 A | 4/1977 | Umphries et al. |
| 4,197,817 A | 4/1980 | Crutchfield |
| 4,328,766 A | 5/1982 | Deibert |
| 4,328,767 A * | 5/1982 | Peterson ..................... 119/794 |
| D268,301 S | 3/1983 | Haslbeck |
| 4,584,967 A * | 4/1986 | Taplin ....................... 119/793 |
| D298,579 S | 11/1988 | Brummett |
| 4,964,370 A * | 10/1990 | Peterson ..................... 119/794 |
| 4,977,860 A * | 12/1990 | Harwell ...................... 119/794 |
| 5,233,942 A * | 8/1993 | Cooper et al. ............... 119/792 |
| D339,430 S | 9/1993 | Reed et al. |
| 5,423,494 A | 6/1995 | Kondo |
| 5,762,029 A | 6/1998 | DuBois et al. |
| 5,816,198 A | 10/1998 | Peterson |

* cited by examiner

*Primary Examiner*—Charles T. Jordan
*Assistant Examiner*—John W. Zerr
(74) *Attorney, Agent, or Firm*—Linda Wheeler

(57) ABSTRACT

A pet collar with an integrated retractable leash includes a recoil mechanism having a coiled spring coupled to an end of the leash, thereby generating the retractability of the leash. At an opposing end to the recoil mechanism is a removable handle for securely maintaining control of the animal wearing the pet collar and retractable leash. The pet collar is adjustable to accommodate a variety of neck sizes of an animal. The pet collar also includes a ring to accommodate a stand-alone leash.

6 Claims, 3 Drawing Sheets

PET COLLAR WITH RETRACTABLE LEASH

RELATED APPLICATIONS

The present invention was first described in Disclosure Document Registration 482,854 filed on Nov. 20, 2000 under 35 U.S.C. § 122 and 37 C.F.R. § 1.14. There are no previously filed, nor currently any co-pending applications anywhere in the world.

FIELD OF THE INVENTION

The present invention relates generally to pet care products and accessories. More specifically, the present invention relates to pet care products and accessories used to walk pets.

BACKGROUND OF THE INVENTION

The act of walking a pet is a pleasure enjoyed by many. In city settings, it is often a necessity for dog owners to walk their dogs. Leash laws are common in many urban and rural cities, alike. Often, the simple task of walking one's pet can turn into a frustrating endeavor when one cannot find the pet's leash. The task is made much easier and less frustrating when the leash is easily found. The majority of pet walking apparatus in existence today require a collar and separate leash and the leash cannot stay attached to the pet when not in use, because it would hinder the mobility of the animal as well as allow the user's handle to become soiled.

A leash/collar combination has been disclosed. U.S. Pat. No. 5,816,198 issued to Peterson and entitled Counterweighted Pet Leash Retracting Collar discloses a pet collar with a reflective strip, a leash, a counterweight and a leash retractor. The counterweight is needed in the '198 Patent to counterbalance the weight of the leash retractor and to ensure that the leash handle always comes to rest on the back of the animal's neck where it is easy for the user to access the leash handle. The extra weight can be cumbersome to the animal wearer.

Accordingly, a need exists for a simple, integrated lightweight collar and leash combination. The present invention fulfills this need.

SUMMARY OF THE INVENTION

The present invention is a collar with an integrated retractable leash. The pet collar with retractable leash is arranged so that no counterweights are necessary. The leash feeds through a portion of the collar into a casing that stores the majority of the leash when not in use. The casing holds a coiled spring that is coupled to one end of the leash and provides the leash with its retractability. The opposite end of the leash forms a handle and is removably attached to the outside of the collar for easy accessibility. The collar portion of the pet collar with retractable leash is adjustable and the leash portion can be any number of lengths preferred by the user. The collar with integrated retractable leash also has a ring that allows it to be used with a conventional leash.

It is the primary object of this invention to provide a pet walking apparatus wherein the pet collar and leash are integrated for easy accessibility of the leash to the user.

It is a further object of this invention to provide a pet collar with a retractable leash.

It is a fturther object of this invention to provide a pet collar with a retractable leash that is compact, durable and lightweight so as not to discomfort the animal wearer.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
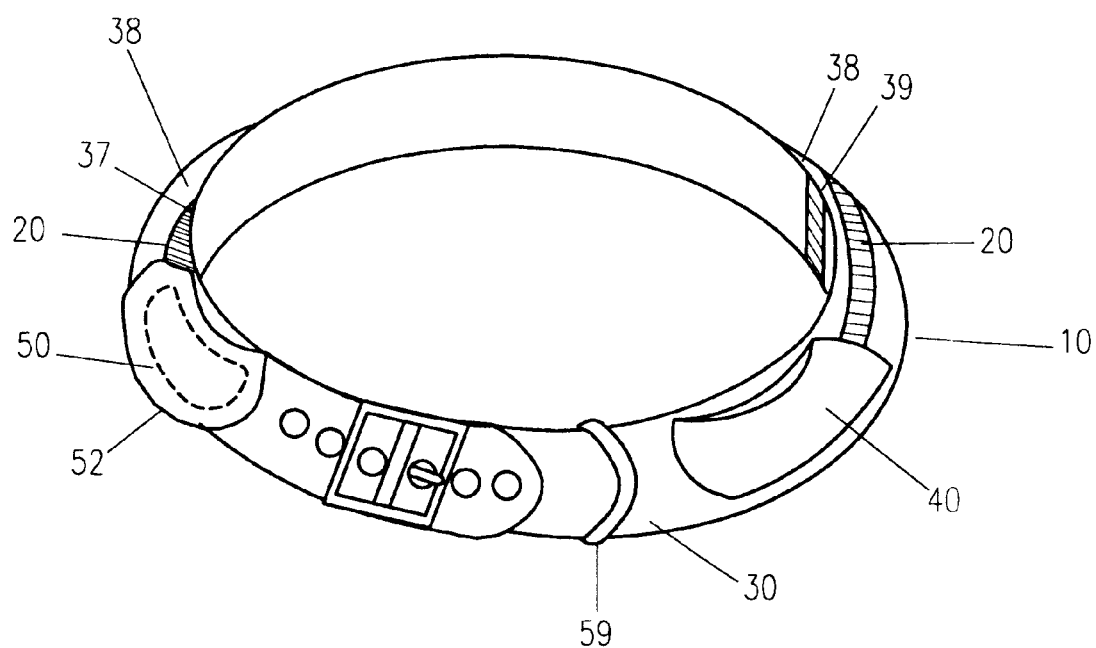
FIG. 1 is a perspective view of the pet collar with retractable leash.
Figure 2:
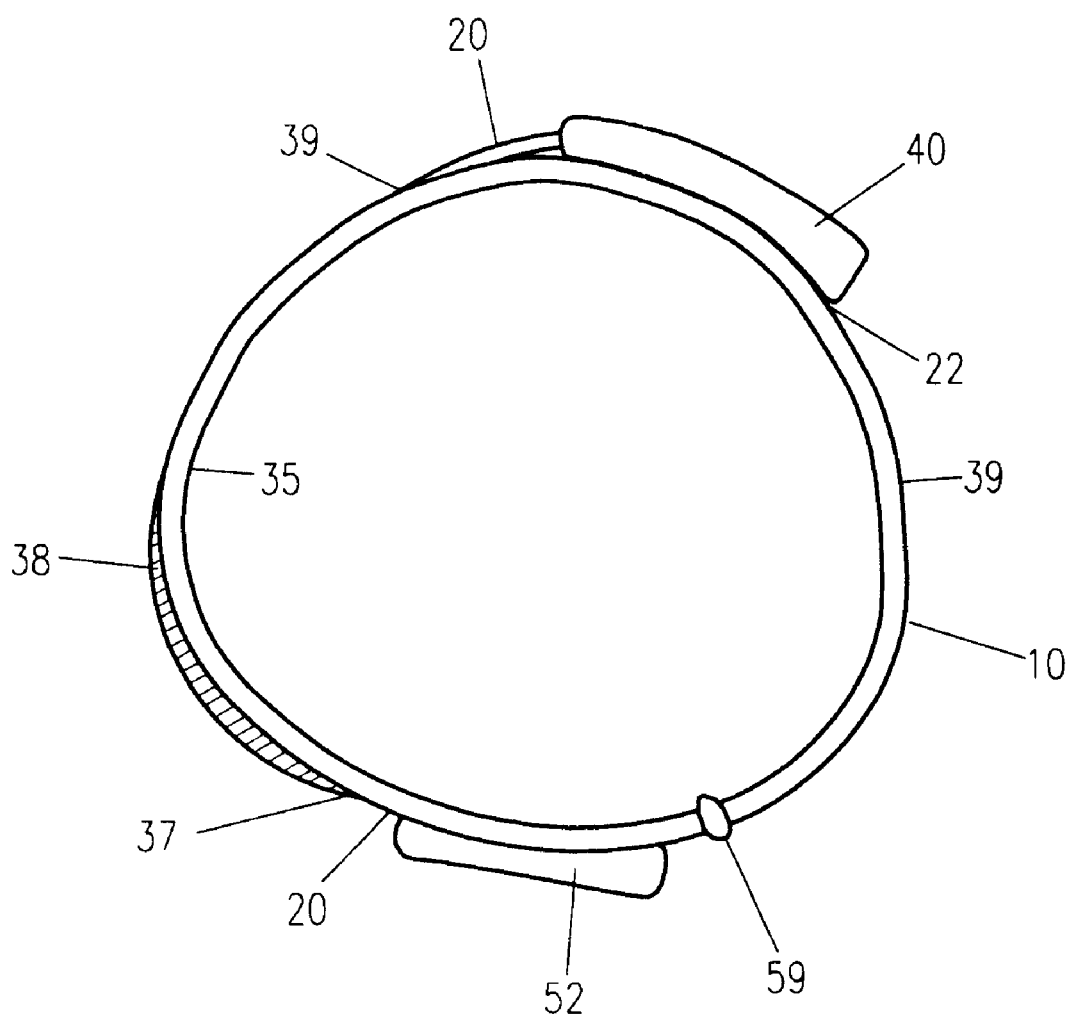
FIG. 2 is a front view of the pet collar with retractable leash.

As seen in FIG's 1 and 2, in the preferred embodiment, the pet collar with retractable leash 10 is a pet collar 30 and retractable leash 20 combination wherein the retractable leash 20 is fed through a pouch 35 attached to the outside of the collar 30, by a fastener 22, such that is becomes a part of the collar 30. The fastener 22 may be hook and loop material, snap fasteners, buttons or other suitable devices. The pouch 35 is preferably a cut of nylon for a nylon collar, leather for a leather collar, etc. that is fastened to the collar 30 along the longest edges of the pouch 35 leaving both ends open. It is preferred that the retractable leash 20 is made of aircraft strength steel cable, although one of ordinary skill in the art would recognize that the retractable leash 20 could be made out of a number of different materials, including but not limited to, nylon. In the preferred embodiment of the collar 30 is adjustable so as to comfortably fit the neck of the animal wearer. In the preferred embodiment, the collar 30 is made out of nylon. One of ordinary skill in the art would recognize, however, that any number of materials could be used to construct the collar 30, including, but not limited to leather, as long as the material is comfortable and pliable so as to form fit the neck of the animal wearer without irritating the animal wearer. In the preferred embodiment, located at the first end 37 of the pouch 35 is a case 52 that houses a recoil mechanism 50. Because of its weight, the case 52 is always located under the animal wearer's head. In the preferred embodiment, the pouch 35 is large enough to allow the retractable leash 20 to easily move through the pouch openings 38, but small enough to prevent the leash handle 40, located outside of the pouch 35 near the second end 39 of the pouch 35, from going therethrough. It is preferred that the pouch 35 be of a length sufficient for the leash handle 40 to be located on the back of the animal wearer's neck for easy access to the pet owner. In the preferred embodiment, the leash handle 40 is removably fastened to the pet collar 30 above the second end 39. Any number of a variety of materials can be used to removably fasten the leash handle 40 to the pet collar 30, including but not limited to hook and loop material, snaps, buttons, etc. It is preferred that the leash handle 40 be constructed of a material such as leather that is comfortable for the pet owner to grip. One of ordinary skill in the art would readily recognize that the leash handle 40 can be constructed of a number of different materials, including, but not limited to nylon. The preferred embodiment also has a second ring 59, preferably made of metal, that is attached to the collar for easy use of another, separate leash for general use.

Figure 3:
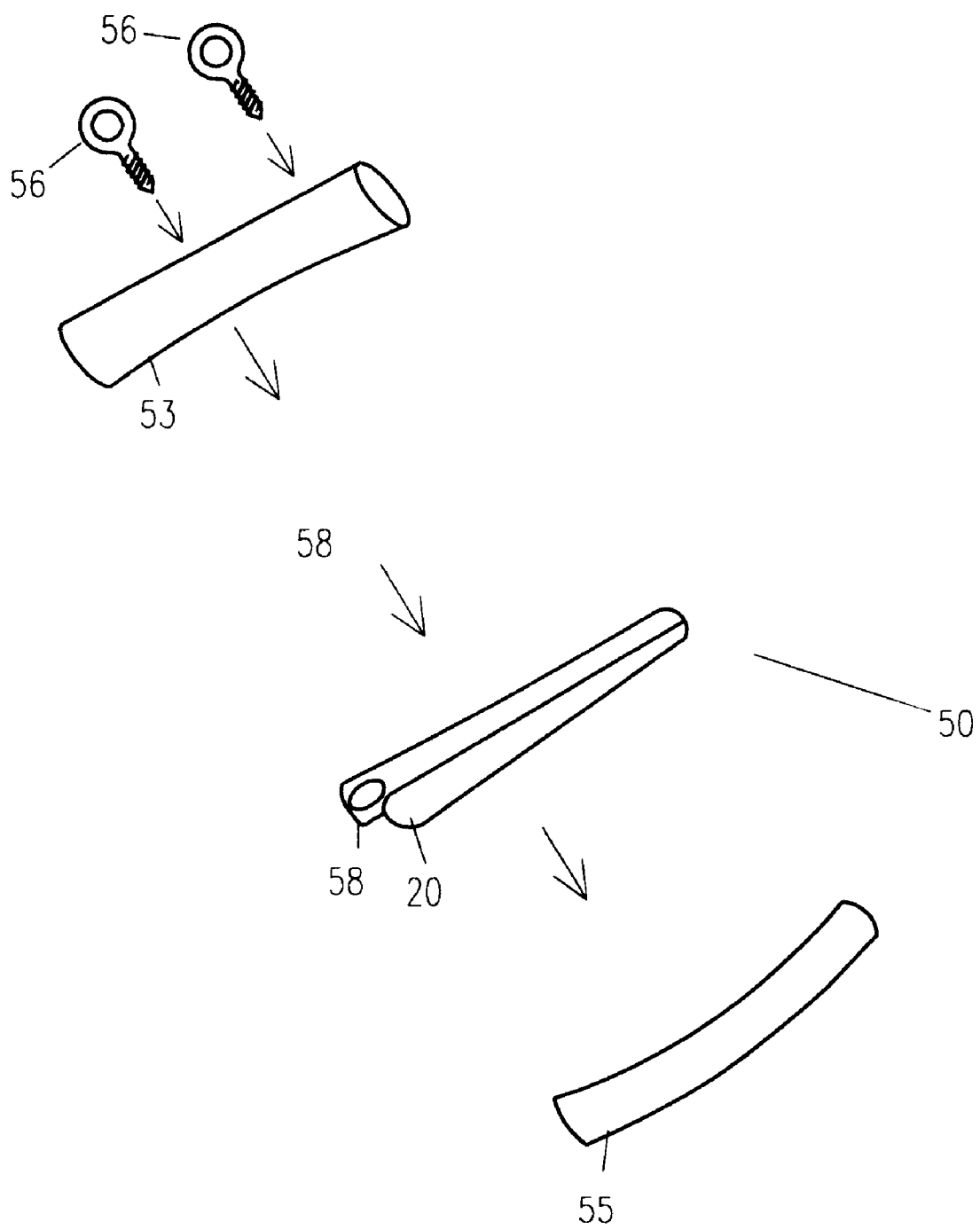
FIG. 3 is an exploded view of the recoil mechanism.

As shown in FIG. 3, in the preferred embodiment, the recoil mechanism 50 consists of a case 52 having a storage part 53 and a lid 55, devised to store the majority of the leash 20 when not in use. The recoil mechanism 50 also has a coiled spring 54 and clasps 56, devised to attach the case 52 to the pet collar 30. It is preferred that the case 52 is constructed from plastic, although one of ordinary skill in the art would recognize that other lightweight, weather resistant materials are feasible. In the preferred embodiment, the coiled spring 54 is located within the case 52 and is attached to one end of the leash 20. It is preferred that the spring 54 is attached to the leash 20 via an aperture 58 in the leash 20 through which the spring 54 is partially inserted. Once the spring 54 is partially inserted, the aperture 58 is welded closed. One of ordinary skill in the art would recognize that there are other ways by which the spring 54 could be attached to the retractable leash 20, including, but not limited to, the use of an adhesive. The coiled spring 54 works to pull the retractable leash 20 back into the case 52 when the retractable leash 20 is not in use. In the preferred embodiment, the clasps 56 fasten the case 52 to the pet collar 30. One of ordinary skill in the art would recognize that the clasps can be of any number of different fastening devices, including, but not limited to, metal clasps.

Although this invention has certain preferred embodiments, it will be obvious to those skilled in the art that various changes and modifications may be made therein without departing from the invention, and all such changes and modifications are intended to fall within the true spirit and scope of the invention.

What is claim is:

1. A pet collar with retractable leash comprising:
   an adjustable collar, said collar having an inner side and an outer side;
   a pouch attached to said outer side of said collar, said pouch having a first opened end and a second opened end;
   a retractable leash fed through said pouch, said retractable leash having a handle outside of said pouch located near said first opened end of said pouch, said handle removably attached to said collar; and
   recoil means, said recoil means comprising an inwardly biased coiled spring housed within a storage case, said spring affixed to an end of said retractable leash for mechanically retracting said retractable leash.

2. The pet collar with retractable leash of claim 1, wherein said handle is attached to said collar by hook and loop fasteners.

3. The pet collar with retractable leash of claim 1, wherein said handle is attached to said collar by snap fasteners.

4. The pet collar with retractable leash of claim 1, wherein said recoil means further comprises:
   a lid, said lid coupled to said storage case;
   an aperture, said aperture formed along the outer surface of said leash, said spring affixed to said leash through said aperture; and
   a plurality of clasps, said clasps securing said storage case to said collar.

5. The pet collar with retractable leash of claim 4, wherein said inwardly biased coiled spring expands when said leash is extended for use, said spring contracts when said leash is released, said spring retracting said leash into said storage case.

6. The pet collar with retractable leash of claim 1 further comprising a ring affixed to said collar for attaching a second leash.

* * * * *